United States Patent
Shi et al.

(10) Patent No.: US 12,256,430 B2
(45) Date of Patent: Mar. 18, 2025

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventors: Cong Shi, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 102 days.

(21) Appl. No.: 17/554,140

(22) Filed: Dec. 17, 2021

(65) Prior Publication Data
US 2022/0110159 A1    Apr. 7, 2022

Related U.S. Application Data

(63) Continuation of application No. PCT/CN2020/129858, filed on Nov. 18, 2020.
(Continued)

(51) Int. Cl.
*H04W 74/08* (2024.01)
*H04W 72/04* (2023.01)
(Continued)

(52) U.S. Cl.
CPC ..... *H04W 74/0816* (2013.01); *H04W 72/044* (2013.01); *H04W 74/0866* (2013.01); *H04W 76/19* (2018.02); *H04W 80/02* (2013.01)

(58) Field of Classification Search
CPC .............. H04W 16/14; H04W 72/044; H04W 74/0808; H04W 74/0816; H04W 74/0866; H04W 76/18; H04W 76/19; H04W 80/02
See application file for complete search history.

(56) References Cited

U.S. PATENT DOCUMENTS

2016/0262118 A1*    9/2016    Kim ..................... H04L 5/001
2017/0006640 A1    1/2017    Dinan
(Continued)

FOREIGN PATENT DOCUMENTS

CN    107371168 A    11/2017
CN    107770868 A    3/2018
(Continued)

OTHER PUBLICATIONS

Supplementary Search Report of European Application No. 20889098.8 Dated Jul. 7, 2022.
(Continued)

*Primary Examiner* — Liton Miah
(74) *Attorney, Agent, or Firm* — BAYES PLLC

(57) ABSTRACT

An apparatus and a method of wireless communication are provided. The method by a user equipment (UE) includes being configured by a base station with a listen before talk (LBT) failure recovery procedure, detecting an LBT failure per uplink (UL) bandwidth part (BWP), and triggering an UL LBT failure medium access control (MAC) control element (CE) for one or more serving cells configured to trigger the LBT failure. This can solve issues in the prior art, trigger an UL LBT failure MAC CE for any serving cell which has triggered an LBT failure, provide a good communication performance, and/or provide high reliability.

10 Claims, 2 Drawing Sheets

Related U.S. Application Data

(60) Provisional application No. 62/937,255, filed on Nov. 18, 2019.

(51) Int. Cl.
*H04W 72/044* (2023.01)
*H04W 74/0816* (2024.01)
*H04W 76/19* (2018.01)
*H04W 80/02* (2009.01)

(56) References Cited

U.S. PATENT DOCUMENTS

| | | | |
|---|---|---|---|
| 2017/0006641 | A1 | 1/2017 | Dinan |
| 2017/0347326 | A1* | 11/2017 | Dinan ................. H04W 52/16 |
| 2019/0363843 | A1* | 11/2019 | Gordaychik ........ H04W 72/044 |
| 2020/0008162 | A1* | 1/2020 | Dinan ................. H04W 52/325 |
| 2020/0154341 | A1* | 5/2020 | Sun ........................ H04W 48/10 |
| 2020/0154475 | A1* | 5/2020 | Pao ........................ H04L 5/0094 |
| 2020/0275430 | A1* | 8/2020 | Salem ................... H04L 1/1614 |
| 2020/0383167 | A1* | 12/2020 | Sengupta ........ H04W 74/0833 |
| 2021/0045070 | A1* | 2/2021 | Yi ......................... H04W 76/27 |
| 2021/0100031 | A1* | 4/2021 | Cirik .................... H04W 76/19 |
| 2021/0144761 | A1* | 5/2021 | Chin ................ H04W 74/0808 |
| 2022/0061055 | A1* | 2/2022 | Freda .................... H04W 72/53 |
| 2022/0201716 | A1* | 6/2022 | Yi ....................... H04W 72/0453 |
| 2022/0394763 | A1* | 12/2022 | Wang ............... H04W 74/0808 |

FOREIGN PATENT DOCUMENTS

| | | |
|---|---|---|
| CN | 107770878 A | 3/2018 |
| CN | 108029141 A | 5/2018 |
| CN | 108633097 A | 10/2018 |
| CN | 110401980 A | 11/2019 |
| WO | 2019127148 A1 | 7/2019 |

OTHER PUBLICATIONS

Huawei et al, "Handling of UL LBT failure", 3GPP TSG-RAN WG2 Meeting 108, R2-1915141, Reno, USA, Nov. 18-22, 2019.

OPPO, "Remaining issues of consistent UL LBT failure", 3GPP TSG-RAN WG2 Meeting #108, R2-1914400, Reno, USA, Nov. 18-Nov. 22, 2019.

Nokia et al, "UL LBT failure report", 3GPP TSG-RAN WG2 Meeting #108, R2-1915886, Reno, USA, Nov. 18-22, 2019.

International Search Report and the Written Opinion Dated Feb. 8, 2021 From the International Searching Authority Re. Application No. PCTCN2020129858, 10 pages.

OPPO, "Uplink LBT Failure Recovery for NR-U", 3GPP TSG-RAN WG2 Meeting #107bis, R2-1912096 Oct. 18, 2019, 3 pages.

Inter Digital, "Handling UL LBT Failures in MAC", 3GPP TSG-RAN WG2 Meeting #107bis, R2-1912889 Oct. 18, 2019, 4 pages.

Ualcomm Incorporated, "Details of the Uplink LBT Failure Mechanism", 3GPP TSG-RAN WG2 Meeting #107bis, R2-1912304 Oct. 18, 2019, 3 pages.

The First Office Action dated Apr. 12, 2023 from Chinese patent application No. 202210226532.1.

The Second Office Action dated Jun. 26, 2023 from Chinese patent application No. 202210226532.1.

* cited by examiner

APPARATUS AND METHOD OF WIRELESS COMMUNICATION

CROSS REFERENCE TO RELATED APPLICATIONS

The disclosure is a continuation of an International Application No. PCT/CN2020/129858, filed on Nov. 18, 2020, titled "APPARATUS AND METHOD OF WIRELESS COMMUNICATION", which claims priority of U.S. provisional patent application No. 62/937,255, filed on Nov. 18, 2019, which is incorporated by reference in the present application in its entirety.

BACKGROUND OF DISCLOSURE

1. Field of Disclosure

The present disclosure relates to the field of communication systems, and more particularly, to an apparatus and a method of wireless communication, which can provide a good communication performance and/or high reliability.

2. Description of Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. A wireless multiple-access communications system may include a number of base stations or network access nodes, each simultaneously supporting communication for multiple communication devices, which may be otherwise known as user equipments (UEs).

A wireless communication network may include a base station that can support communication for a UE. The UE may communicate with the base station via downlink and uplink. The downlink refers to a communication link from the base station to the UE, and the uplink refers to a communication link from the UE to the base station. In the wireless communication system operating in high frequency bands, paging transmission/reception leads to increased signaling overhead and UE power consumption.

Therefore, there is a need for an apparatus (such as a user equipment (UE) and/or a base station) and a method of wireless communication, which can solve issues in the prior art, trigger an UL LBT failure MAC CE for any serving cell which has triggered an LBT failure, provide a good communication performance, and/or provide high reliability.

SUMMARY

An object of the present disclosure is to propose an apparatus (such as a user equipment (UE) and/or a base station) and a method of wireless communication, which can solve issues in the prior art, trigger an UL LBT failure MAC CE for any serving cell which has triggered an LBT failure, provide a good communication performance, and/or provide high reliability.

In a first aspect of the present disclosure, a method of wireless communication by a user equipment (UE), comprising being configured by a base station with a listen before talk (LBT) failure recovery procedure; detecting an LBT failure per uplink (UL) bandwidth part (BWP); and triggering an UL LBT failure medium access control (MAC) control element (CE) for one or more serving cells configured to trigger the LBT failure.

In a second aspect of the present disclosure, a method of wireless communication by a base station comprising configuring, to a user equipment (UE), a listen before talk (LBT) failure recovery procedure; controlling the UE to detect an LBT failure per uplink (UL) bandwidth part (BWP); and controlling the UE to trigger an UL LBT failure medium access control (MAC) control element (CE) for one or more serving cells configured to trigger the LBT failure.

In a third aspect of the present disclosure, a user equipment comprises a memory, a transceiver, and a processor coupled to the memory and the transceiver. The processor is configured by a base station with a listen before talk (LBT) failure recovery procedure. The processor is configured to detect an LBT failure per uplink (UL) bandwidth part (BWP). The processor is configured to trigger an UL LBT failure medium access control (MAC) control element (CE) for one or more serving cells configured to trigger the LBT failure.

In a fourth aspect of the present disclosure, a base station comprises a memory, a transceiver, and a processor coupled to the memory and the transceiver. The processor is configured to configure, to a user equipment (UE), a listen before talk (LBT) failure recovery procedure. The processor is configured to control the UE to detect an LBT failure per uplink (UL) bandwidth part (BWP). The processor is configured to control the UE to trigger an UL LBT failure medium access control (MAC) control element (CE) for one or more serving cells configured to trigger the LBT failure.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
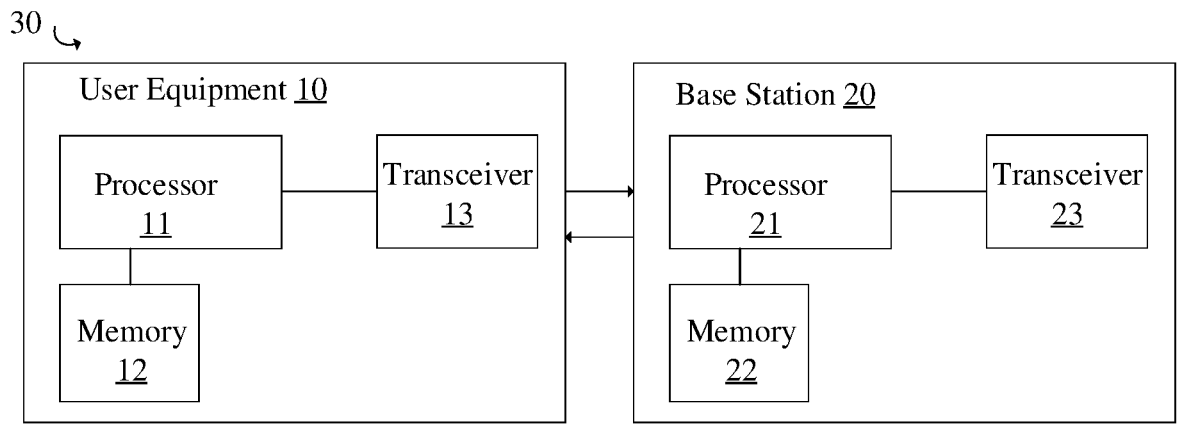
FIG. 1 is a block diagram of one or more user equipments (UEs) and a base station of wireless communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

An unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability. An LBT is also called a channel access procedure. UE performs the channel access procedure before the transmission, if the channel access procedure is successful, i.e. the channel is sensed to be idle, the UE starts to perform the transmission. If the channel access procedure is not successful, i.e. the channel is sensed to be not idle, the UE cannot perform the transmission.

In a current discussion, it is agreed to introduce a mechanism to handle an uplink (UL) LBT failure: Adopt a mechanism in medium access control (MAC) specification to handle the UL LBT failure, where "consistent" UL LBT failures, at least for UL transmissions of scheduling request (SR), random access channel (RACH), and physical uplink shared channel (PUSCH), are used for problem detection.

In a current discussion, further agreements on the UL LBT failures have been agreed: layer 2 (L2) LBT failure mechanism may take into account any LBT failure regardless UL transmission type. The UL LBT failure mechanism may have the same recovery mechanism for all failures regardless UL transmission type. Baseline mechanism, further enhancements not preclude: A "threshold" for the maximum number of LBT failures which triggers the "consistent" LBT failure event will be used. Both a timer and a counter are introduced, the counter is reset when the timer expires and incremented when an UL LBT failure happens. The timer is started/restarted when the UL LBT failure occurs. Summary on the baseline mechanism: Beam failure detection ("BFD") inspired mechanism seems to be supported by many, but there are also some concerns. Agree it as a baseline mechanism to allow further review later, to understand whether further enhancements are needed. UL LBT failures are detected per bandwidth part (BWP). A user equipment (UE) will report the occurrence of consistent UL LBT failures on a primary secondary cell (PSCell) and secondary cells (SCells). The assumption is to reuse SCell failure reporting for beamforming (BF).

Further, in a current discussion, the following agreements are made: MAC relies on reception of a notification of UL LBT failure from a physical layer to detect a consistent UL LBT failure. A UE switches to another BWP and initiates RACH upon declaration of consistent LBT failure on primary cell (PCell) or PSCell if there is another BWP with configured RACH resources. The UE performs radio link failure (RLF) recovery if the consistent UL LBT failure is detected on the PCell and UL LBT failure is detected on "N" possible BWPs. When consistent uplink LBT failures are detected on the PSCell, the UE informs a master node (MN) via a secondary cell group (SCG) failure information procedure after detecting a consistent UL LBT failure on "N" BWPs. "N" is the number of configured BWPs with configured physical random access channel (PRACH) resources. If N is larger than one it is up to the UE implementation which BWP the UE selects. When consistent uplink LBT failures are detected on an SCell, a new MAC control element (CE) to report the consistent uplink LBT failures to the node where SCell belongs to is used. Further to study (FFS): whether the MAC CE can be used to report the consistent uplink LBT failures on PCell.

Some current technologies relate to the field of UL LBT failure. More particularly, some current technologies are as follows.

UL LBT Failures for SCell(s)

Regarding consistent UL LBT failure detection on SCell, there are some further to study (FFS) issues: FFS: what a priority of a MAC CE is in a logical channel prioritization (LCP). FFS: if we need to handle case when there are no subsequent UL resources available. FFS: if we need to limit a MAC CE transmission to other BWPs than a BWP where an LBT failure is declared.

For the first FFS, in some views of some embodiments of the present disclosure, SCell may have some issues if a UE detects a consistent UL LBT failure which is similar to the case when the UE declares beam failure for that SCell, thus some views think a MAC CE for reporting a SCell LBT problem can have the similar priority as a beam failure recovery (BFR) MAC CE being discussed.

Proposal 1: In some embodiments of the present disclosure, MAC CE for UL LBT problem can have similar priority as the BFR MAC CE.

Regarding the second FFS, some views think similar as the BFR MAC CE case, when there is no available UL resource available, a UE would need to send a SR to a network to request uplink resources, otherwise, the network would not realize the UL LBT issue.

Proposal 2: In some embodiments of the present disclosure, similar as the BFR MAC CE, UE can trigger a SR if there are no available UL resources for sending the MAC CE for SCell UL LBT problem.

Regarding the third FFS, there is no need to have this limitation that the MAC CE should be transmitted on a different serving cell other than the SCell which has the UL LBT problem. The reason is that the consistent LBT failure only reflects the channel occupancy condition for a period, it does not mean the channel is always occupied.

Proposal 3: In some embodiments of the present disclosure, no need to have the limitation that the MAC CE should be transmitted on a different serving cell other than the SCell which has the UL LBT problem.

The MAC CE should be used to indicate which SCell has the consistent UL LBT failure, there is no need to trigger the MAC CE again if there is already MAC CE triggered but not sent ii to the network.

Proposal 4: In some embodiments of the present disclosure, no need to re-trigger the MAC CE if there is already MAC CE triggered for consistent UL LBT failure for a SCell.

Regarding a MAC CE format, some views think the consistent UL LBT failure is triggered independently among different SCells. It could be possible that there are multiple MAC CEs triggered for different SCells if those SCells have the consistent UL LBT failure. From this perspective, it's beneficial to include all the related SCells which have the consistent UL LBT failure into a single MAC CE format, i.e., the MAC CE format should support multiple entries to indicate multiple SCells which have the consistent UL LBT failure.

Proposal 5: In some embodiments of the present disclosure, the MAC CE format should support multiple entries to indicate all the SCells which have already declared the consistent UL LBT failure.

UL LBT Failures for SpCell

In a current discussion, it's agreed that a UE can report to a master node (MN) an LBT failure by a SCG failure information procedure if a PSCell detects a consistent LBT failure.

When consistent uplink LBT failures are detected on the PSCell, the UE informs the MN via the SCG failure information procedure after detecting a consistent UL LBT failure on "N" BWPs.

After detecting a consistent UL LBT failure on "N" BWPs, it's relied on SCG failure information to report the LBT failure for PSCell. Network should be aware of the LBT failure on PSCell, currently, there are different conditions which can trigger SCG failure procedure. In order to make the network differentiate the LBT failure from other conditions, it's proposed to add new failure type when reporting SCGFailureInformation.

Proposal 6: In some embodiments of the present disclosure, a new failure type for PSCel consistent UL LBT failure is added in the SCGFailureInformation.

If proposal 6 is confirmed, there is no need to trigger a MAC CE for the PSCel if there is a consistent UL LBT failure.

There is another FFS left from a current discussion that whether a MAC CE is applied to a PCell or not.

In some views, it's not needed, i.e., a MAC CE is not applied to a PCell either. The reason is that a network can realize the LBT failure issue on PCell based on the BWP switching, i.e., BWP switching to another non-initial BWP. Even though it could be only single initial BWP for PCell, some companies may argue in this case that a gNB may not differentiate the LBT failure issue from other causes. However, some views have decided UE just initiate RLF procedure for the case of PCell LBT problem, no other special handling for this case. Thus, even if in some cases the gNB may not differentiate the case from other cases, it should be no issues.

Proposal 7: In some embodiments of the present disclosure, when a consistent UL LBT failure is declared on a SpCell, a UE does not trigger a MAC CE.

Regarding how to report the consistent UL LBT failure, it's agreed to use MAC CE for SCell. However, for SpCell (including PCell and PSCell), it's not yet concluded. The possible issues are that, a network may not be aware how does a RACH is triggered if a UE triggers UL LBT failure and switches UL BWP for SpCell.

Therefore, some embodiments of the present disclosure propose an apparatus (such as a user equipment (UE) and/or a base station) and a method of wireless communication, which can solve issues in the prior art, trigger an UL LBT failure MAC CE for any serving cell which has triggered an LBT failure, provide a good communication performance, and/or provide high reliability.

FIG. 1 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured by the base station 20 with a listen before talk (LBT) failure recovery procedure. The processor 11 is configured to detect an LBT failure per uplink (UL) bandwidth part (BWP). The processor 11 is configured to trigger an UL LBT failure medium access control (MAC) control element (CE) for one or more serving cells configured to trigger the LBT failure. This can solve issues in the prior art, trigger an UL LBT failure MAC CE for any serving cell which has triggered an LBT failure, provide a good communication performance, and/or provide high reliability.

In some embodiments, the processor 21 is configured to configure, to the user equipment (UE) 10, a listen before talk (LBT) failure recovery procedure. The processor 21 is configured to control the UE 10 to detect an LBT failure per uplink (UL) bandwidth part (BWP). The processor 21 is configured to control the UE 10 to trigger an UL LBT failure medium access control (MAC) control element (CE) for one or more serving cells configured to trigger the LBT failure. This can solve issues in the prior art, trigger an UL LBT failure MAC CE for any serving cell which has triggered an LBT failure, provide a good communication performance, and/or provide high reliability.

Figure 2:
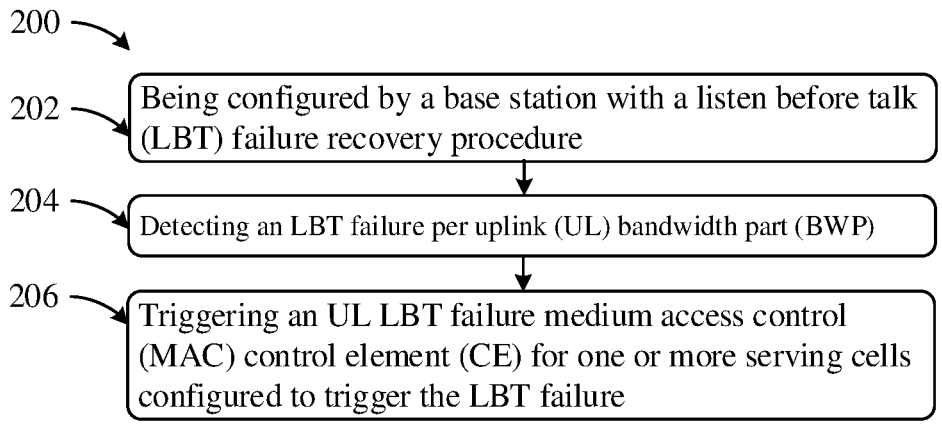
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, being configured by a base station with a listen before talk (LBT) failure recovery procedure, a block 204, detecting an LBT failure per uplink (UL) bandwidth part (BWP), and a block 206, triggering an UL LBT failure medium access control (MAC) control element (CE) for one or more serving cells configured to trigger the LBT failure. This can solve issues in the prior art, trigger an UL LBT failure MAC CE for any serving cell which has triggered an LBT failure, provide a good communication performance, and/or provide high reliability.

Figure 3:
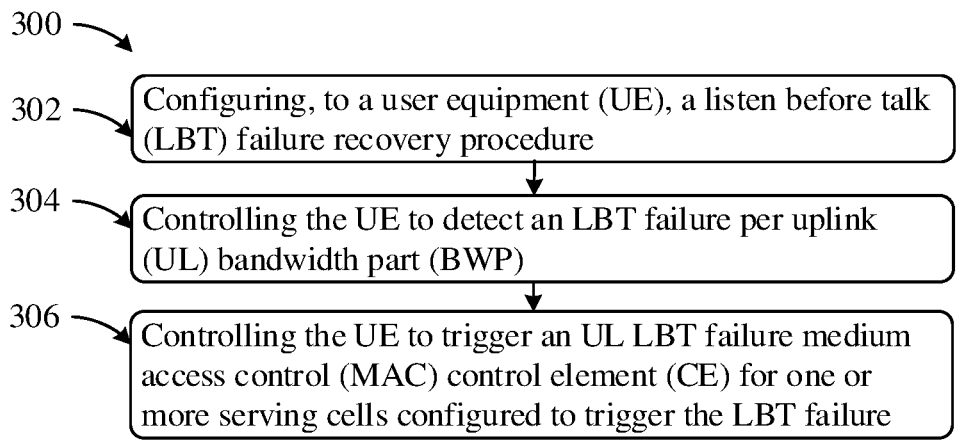
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring, to a user equipment (UE), a listen before talk (LBT) failure recovery procedure, a block 304, controlling the UE to detect an LBT failure per uplink (UL) bandwidth part (BWP), and a block 306, controlling the UE to trigger an UL LBT failure medium access control (MAC) control element (CE) for one or more serving cells configured to trigger the LBT failure. This can solve issues in the prior art, trigger an UL LBT failure MAC CE for any serving cell which has triggered an LBT failure, provide a good communication performance, and/or provide high reliability.

In some embodiments, the method further comprises transmitting, to the base station by the UE, a MAC CE having a serving cell information configured to trigger the UL LBT failure MAC CE. In some embodiments, if the MAC CE has been transmitted on the one or more serving cells, the UE cancels one or more triggered MAC CEs. In some embodiments, the serving cell information of the MAC CE comprises at least one of the followings: a report of failed cells; a MAC CE format configured to support entries to indicate one or more cells, wherein the one or more cells declares the consistent LBT failure; one or more cell indexes of the UL LBT failure MAC CE where the LBT failure occurs; or a BWP related information in the MAC CE. In some embodiments, the LBT failure comprises a consistent LBT failure. In some embodiments, if the UE declares the consistent LBT failure for an active UL BWP and if the one or more serving cells comprises one or more secondary cells (SCells), the UE indicates a multiplexing and assembly entity to include the UL LBT failure MAC CE in a subsequent uplink transmission. In some embodiments, the uplink transmission does not happen on one or more SCells which have declared the consistent LBT failure.

In some embodiments, if there are no available UL resources on one or more SCells which have not yet declared the consistent LBT failure and/or there are no available UL resources on one or more special cells (SpCells), the UE triggers a scheduling request (SR) to request an UL grant. In some embodiments, if the UE declares the consistent LBT failure for the active UL BWP and if the one or more serving cells comprises one or more special cells (SpCells), the UE performs at least one of the followings: if the consistent LBT failure has been declared in one or more UL BWPs configured with one or more physical random access channel (PRACH) occasions in the one or more SpCells, the UE indicates the consistent LBT failure to one or more upper layers; indicating the multiplexing and assembly entity to include the UL LBT failure MAC CE in the subsequent uplink transmission; if there are no available UL resources on another or other serving cells which have not yet declared the consistent LBT failure, the UE triggers a SR to request an UL grant; switching the active UL BWP to an UL BWP, in the one or more SpCells, configured with one or more PRACH occasions and for which the consistent LBT failure has not been declared; or initiating a random access procedure.

In some embodiments, the UE includes the LBT failure MAC CE in a message 3 (msg3) of the random access procedure if a RACH procedure is successfully performed. In some embodiments, if the UE successfully transmits, to the base station, the UL LBT failure MAC CE, the UE cancels one or more MAC CE triggers for the one or more serving cells configured to trigger the consistent LBT failure. In some embodiments, the one or more MAC CE triggers comprise one or more triggered MAC CEs for UL BWP of the one or more SpCells. In some embodiments, a format of the UL LBT failure MAC CE comprises at least one of the followings: a first format comprising a bitmap with a size equal to a maximum number of serving cells for a carrier group (CG) and/or a bitmap with a size equal to a maximum number of UL BWPs of the SpCell; or a second format comprising a SCell index for which the UE declares the consistent LBT failure and/or a BWP index for which the UE declares the consistent LBT failure. In some embodiments, a first format comprising a bitmap with a size equal to a maximum number of a PCell plus SCells for a master cell group (MCG). In some embodiments, a first format comprising a bitmap with a size equal to a maximum number of a PSCell plus SCells for a secondary cell group (SCG). In some embodiments, a corresponding bit field of the bitmap of the first format is set to 1 if a corresponding serving cell declares the consistent LBT failure.

In some embodiments, a first format comprising the bitmap with the size equal to the maximum number of UL BWPs of the SpCell comprises 4 UL BWPs for a PCell and 4 UL BWPs for a PSCell. In some embodiments, a corresponding bit field of the bitmap of the first format is set to 1 if a corresponding UL BWP of the SpCell declares the consistent LBT failure. In some embodiments, the LBT failure recovery procedure comprises a consistent LBT failure recovery procedure, and the consistent LBT failure recovery procedure is configured to a MAC entity of the UE by radio resource control (RRC) by the base station. In some embodiments, the consistent LBT failure is detected per UL BWP by counting LBT failure indications, for all UL transmissions, from one or more lower layers of the UE to the MAC entity. In some embodiments, the RRC configures at least one of the following parameters in the consistent LBT failure recovery procedure: lbt-FailureInstanceMax-Count for a consistent LBT failure detection; or lbt-FailureDetectionTimer for the consistent LBT failure detection. In some embodiments, the following UE variable is used for the consistent LBT failure detection: LBT_COUNTER: counter for LBT failure indication which is initially set to 0.

In some embodiments, for each activated serving cell configured with the LBT failure recovery procedure, the MAC entity performs at least one of the followings: if the LBT failure indication has been received from the one or more lower layers, the MAC entity starts or restarts the lbt-FailureDetectionTimer and/or increases the LBT_COUNTER by 1. In some embodiments, if the LBT_COUNTER is greater or equal to lbt-FailureInstanceMaxCount, the MAC entity declares the consistent LBT failure for the active UL BWP. In some embodiments, if the serving cell is an SCell and if UL-synchronization channel (SCH) resources are available on serving cells which have not yet triggered the consistent LBT failure for a new transmission and the UL-SCH resources can accommodate the UL LBT failure MAC CE plus its subheader as a result of logical channel prioritization, the MAC entity instructs the multiplexing and assembly entity to generate the UL LBT failure MAC CE. In some embodiments, if the serving cell is an SCell and if the UL-SCH resources are not available on the serving cells which have not yet triggered the consistent LBT failure for a new transmission, the MAC entity triggers a SR for the consistent LBT failure. In some embodiments, if the serving cell is an SpCell and if the consistent LBT failure has been declared in all UL BWPs configured with PRACH occasions in the SpCell, the MAC entity indicates the consistent LBT failure to the one or more upper layers of the UE.

In some embodiments, if the serving cell is an SpCell, the MAC entity performs at least one of the followings: switching the active UL BWP to an UL BWP, in the SpCell, configured with a PRACH occasion and for which the consistent LBT failure has not been declared; performing a BWP operation; or initiating a random access procedure. In some embodiments, if the serving cell is an SpCell, the MAC entity indicates the multiplexing and assembly entity to include the LBT failure MAC CE in a msg3 transmission. In some embodiments, if the lbt-FailureDetectionTimer or the lbt-FailureInstanceMaxCount is reconfigured by the one or more upper layers, the MAC entity sets the LBT_COUNTER to 0. In some embodiments, the LBT failure MAC CE is identified by a MAC subheader with a logical channel identifier (LCID). In some embodiments, the LBT failure MAC CE has a variable size and comprises the following fields: C0, C1, C2, C3, C4, C5, C6, C7, C8, C9, C10, C11, C12, C13, C14, and C15 corresponding to the serving cell of one CG; and B0, B1, B2, and B3 corresponding to a BWP index of either PCell or PScell.

LBT Operation

In some embodiments, a lower layer may perform an LBT procedure according to which a transmission is not performed by lower layers if a channel is identified as being occupied. When the lower layer performs an LBT procedure before a transmission and the transmission is not performed, an LBT failure indication is sent to the MAC entity from lower layers. Unless otherwise specified, when the LBT procedure is performed for a transmission, actions as specified in this specification are performed regardless of if an LBT failure indication is received from lower layers. When the LBT is not performed by the lower layers, LBT failure indication is not received from lower layers.

In some embodiments, a UE can trigger an uplink LBT failure MAC CE for any serving cell (such as SCell and/or SpCell) which has triggered an uplink LBT failure. Then, the UE can transmit a MAC CE which has at least serving cell information which has triggered the uplink LBT failure MAC CE. If the MAC CE has been transmitted on a serving cell, the UE will cancel all the triggered MAC CE. This can solve issues in the prior art, trigger an UL LBT failure MAC CE for any serving cell which has triggered an LBT failure, provide a good communication performance, and/or provide high reliability.

The transmitted MAC CE can include all the information of serving cell which has triggered the uplink LBT failure, e.g. the MAC CE can report multiple failed Cells and the MAC CE format should support multiple entries to indicate all the cells which have already declared consistent UL LBT failure, wherein the UL LBT MAC CE includes cell index(es) where the UL LBT failure occurs. Besides, since for SpCell (PCell and PSCell), the UE will switch an active UL BWP to another UL BWP (this BWP is configured with RACH resources) when UE declares the UL LBT failure for the active UL BWP. Therefore, a network may need to be aware of the UL BWP information of SpCell for which the UE has declared the UL LBT failure. Thus, optionally, the UE can also include BWP related information in the MAC CE.

In some embodiments, the detailed procedure for the above is as follows:

Step 1: If the UE declares the consistent LBT failure for the active UL BWP and if the serving cell is SCell, the UE indicates a multiplexing and assembly entity to include the LBT failure MAC CE in the subsequent uplink transmission, the uplink transmission should not happen on SCells which have declared the consistent LBT failure. If there are no available UL resources on SCells which have not yet declared the consistent LBT failure or there are no available UL resources on SpCell, the UE triggers a scheduling request (SR) to request an UL grant.

Step 2: If the UE declares the consistent LBT failure for the active UL BWP and the serving cell is SpCell:

Step 2.1: If the consistent LBT failure has been declared in all UL BWPs configured with PRACH occasions in this serving cell: the UE indicates the consistent LBT failure to upper layers.

Step 2.2: Else:

The UE indicates the multiplexing and assembly entity to include the LBT failure MAC CE in the subsequent uplink transmission. Optional behavior: If there are no available UL resources on other serving cells which have not yet declared consistent LBT failure, the UE triggers a scheduling request to request an UL grant. Optionally, the UE switches the active UL BWP to an UL BWP, in this serving cell, configured with PRACH occasion and for which the consistent LBT failure has not been declared, the UE initiates a random access procedure. Optionally, the UE includes the LBT failure MAC CE in a message 3 (msg3) of the random access procedure if the RACH procedure can be successfully performed.

Step 3: If the UE successfully transmits the LBT failure MAC CE, the UE cancels all the MAC CE triggers for serving cells which triggers the consistent LBT failure, including those triggered MAC CEs for UL BWP of SpCell.

In some embodiments, a format of the LBT failure MAC CE can be at least one of the followings:

Format 1

The LBT failure MAC CE includes a bitmap with the size equal to the maximum number of serving cells for a CG, e.g., PCell+SCells for MCG and/or PSCell+SCells for SCG. The corresponding bit field of the bitmap is set to 1 if the corresponding serving cell declares the consistent LBT failure. The LBT failure MAC CE also includes a bitmap with the size equal to the maximum number of UL BWP of SpCell (i.e., 4 for PCell and 4 for PSCell), the corresponding bit field of the bitmap is set to 1 if the corresponding UL BWP of the SpCell declares the consistent LBT failure.

Format 2

The LBT failure MAC CE includes a SCell index for which the UE declares the consistent LBT failure. The LBT failure MAC CE includes a BWP index for which the UE declares the consistent LBT failure.

In some embodiments, possible implementation of a procedure in a MAC specification is as follows:

LBT Failure Detection and Recovery Procedure

A MAC entity may be configured by an RRC with a consistent LBT failure recovery procedure. Consistent LBT failure is detected per UL BWP by counting LBT failure indications, for all UL transmissions, from lower layers to the MAC entity.

RRC configures following parameters in lbt-FailureRecoveryConfig:

lbt-FailureInstanceMaxCount for the consistent LBT failure detection; and lbt-FailureDetectionTimer for the consistent LBT failure detection.

The following UE variable(s) is used for the consistent LBT failure detection procedure:

LBT_COUNTER: counter for LBT failure indication which is initially set to 0.

For each activated serving cell configured with lbt-FailureRecoveryConfig, the MAC entity shall:

1> if LBT failure indication has been received from lower layers:
   2> start or restart the lbt-FailureDetectionTimer;
   2> increment LBT_COUNTER by 1;
   2> if LBT_COUNTER>=lbt-FailureInstanceMaxCount:
     3> declare consistent LBT failure for the active UL BWP;
     3> if this Serving Cell is an SCell:
        4> if UL-SCH resources are available on serving cells which has not yet trigger consistent LBT failure for a new transmission and the UL-SCH resources can accommodate the LBT failure MAC CE plus its subheader as a result of logical channel prioritization:
           5> instruct the Multiplexing and Assembly procedure to generate the LBT failure MAC CE.
        4> else:
     3> trigger a Scheduling Request for consistent LBT failure.
     3> else (i.e. SpCell):
        4> if consistent LBT failure has been declared in all UL BWPs configured with PRACH occasions in this Serving Cell:
           5> indicate consistent LBT failure to upper layers.
        4> else:
           5> switch the active UL BWP to an UL BWP, in this Serving Cell, configured with PRACH occasion and for which consistent LBT failure has not been declared;
           5> perform the BWP operation as specified in clause 5.15;
           5> initiate a Random Access Procedure (as specified in clause 5.1.1).
              6> indicate to the Multiplexing and assembly entity to include a generate the LBT failure MAC CE in the msg3 transmission. (This may be implemented in RACH procedure section). Editor's Note: This captures agreement "the UE switches to another BWP and initiates RACH upon declaration of consistent LBT failure on PCell or PSCell if there is another BWP with configured RACH resources."

1> if the lbt-FailureDetectionTimer expires; or
1> if lbt-FailureDetectionTimer or lbt-FailureInstanceMaxCount is reconfigured by upper layers:
   2> set LBT_COUNTER to 0.

LBT Failure MAC

The LBT failure MAC is identified by a MAC subheader with LCID. It has variable size and consists of the following fields as illustrated in Table 1:

TABLE 1

| SCell BFR MAC CE | | | | | | | |
|---|---|---|---|---|---|---|---|
| C7 | C6 | C5 | C4 | C3 | C2 | C1 | C0 |
| C15 | C14 | C13 | C12 | C11 | C10 | C9 | C8 |
| R | R | R | R | B3 | B2 | B1 | B0 |

C0~C15 are corresponding to the serving cell of one CG. B0~B3 are corresponding to the BWP index of either PCell or PSCell.

The LBT failure MAC CE includes a bitmap with the size equal to the maximum number of serving cells for a CG, e.g., PCell+SCells for MCG, PSCell+SCells for SCG. The corresponding bit field of the bitmap is set to 1 if the corresponding serving cell declares consistent LBT failure. The LBT failure MAC CE also includes a bitmap with the size equal to the maximum number of UL BWP of SpCell (i.e., 4 for PCell, 4 for PSCell), the corresponding bit field of the bitmap is set to 1 if the corresponding UL BWP of the SpCell declares consistent LBT failure.

TABLE 2

| Optionally, SCell BFR MAC CE is provided. | |
|---|---|
| C/B = C | SCell index#1 |
| ... | |
| C/B = C | SCell index#2 |
| C/B = B | BWP index#1 |
| ... | |
| C/B = B | BWP index#2 |

The LBT failure MAC CE includes a SCell index for which the UE declares the consistent LBT failure. The LBT failure MAC CE includes a BWP index for which the UE declares the consistent LBT failure.

Figure 4:
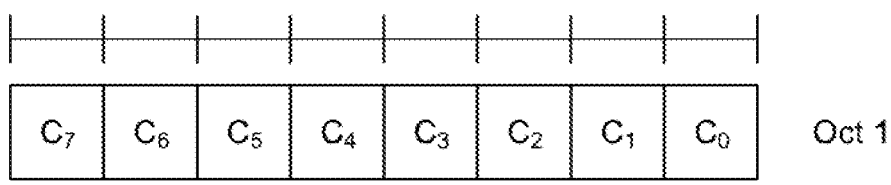
FIG. 4 is a schematic diagram illustrating an LBT failure MAC CE of one octet according to an embodiment of the present disclosure.
Figures 5, 6:
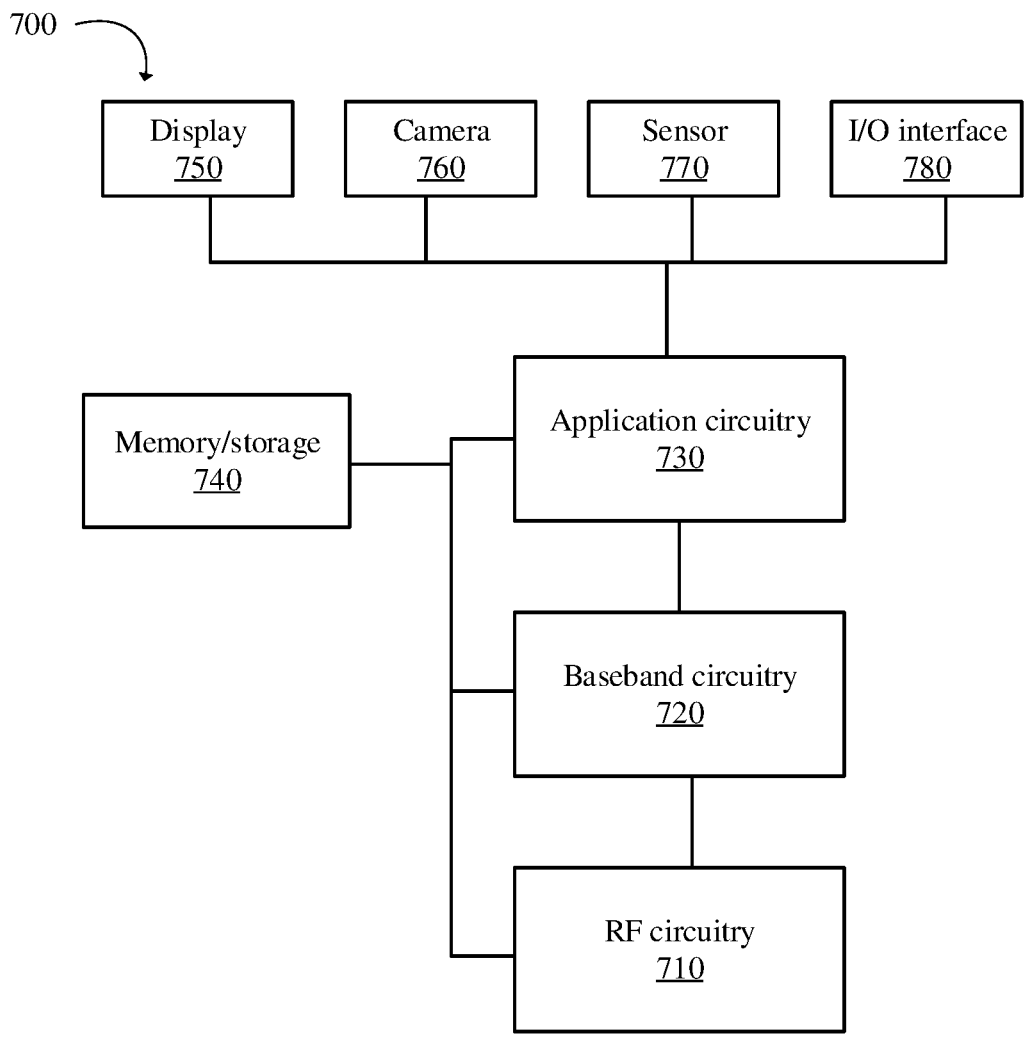
FIG. 5 is a schematic diagram illustrating an LBT failure MAC CE of four octets according to an embodiment of the present disclosure.
FIG. 6 is a block diagram of a system for wireless communication according to an embodiment of the present disclosure.

In some embodiments, LBT failure MAC CEs are provided. The LBT failure MAC CE of one octet is identified by a MAC subheader with LCID. It has a fixed size and consists of a single octet containing 8 C-fields as illustrated in FIG. 4. In some embodiments, the LBT failure MAC CE of four octets is identified by a MAC subheader with LCID. It has a fixed size and consists of four octets containing 32 C-fields as illustrated in FIG. 5. A single octet format is used when the highest ServCellIndex of this MAC entity's SCell for which LBT failure is detected is less than 8, otherwise four octets format is used.

Ci: If there is a serving cell configured for the MAC entity with ServCellIndex I and if consistent LBT failures have been triggered and not cancelled in this serving cell, the field is set to 1, otherwise the field is set to 0.

Commercial interests for some embodiments are as follows. 1. Solving issues in the prior art. 2. Triggering an UL LBT failure MAC CE for any serving cell which has triggered an LBT failure. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
    being configured by a base station with a listen before talk (LBT) failure recovery procedure;
    detecting an LBT failure per uplink (UL) bandwidth part (BWP); and
    triggering an UL LBT failure medium access control (MAC) control element (CE) for one or more serving cells configured to trigger the LBT failure;
    wherein a format of the UL LBT failure MAC CE comprises a bitmap with a size equal to a maximum number of serving cells for a carrier group (CG);
    wherein in the bitmap of the format, a corresponding bit field of a corresponding serving cell is set to a first value if the corresponding serving cell has a consistent LBT failure; and the corresponding bit field of the corresponding serving cell is set to a second value if the corresponding serving cell does not have the consistent LBT failure;
    wherein the method further comprises transmitting, to the base station, a MAC CE configured to trigger the UL LBT failure MAC CE;
    wherein if the MAC CE has been transmitted on the one or more serving cells, the UE cancels one or more triggered MAC CEs;
    wherein the LBT failure comprises the consistent LBT failure, wherein if the UE declares the consistent LBT failure for an active UL BWP and if the one or more serving cells comprises one or more secondary cells (SCells), the UE indicates a multiplexing and assembly entity to include the UL LBT failure MAC CE in a subsequent uplink transmission, and wherein the uplink transmission does not happen on the one or more SCells which have declared the consistent LBT failure.

2. The method of claim 1, wherein serving cell information of the MAC CE comprises at least one of the followings:
    a report of failed cells;
    a MAC CE format configured to support entries to indicate one or more cells, wherein the one or more cells declares consistent LBT failure;
    one or more cell indexes of the UL LBT failure MAC CE where the LBT failure occurs; or
    a BWP related information in the MAC CE.

3. The method of claim 1, wherein if there are no available UL resources on one or more SCells which have not yet declared consistent LBT failure and/or there are no available UL resources on one or more special cells (SpCells), the UE triggers a scheduling request (SR) to request an UL grant.

4. A user equipment (UE), comprising:
    a memory;
    a transceiver; and
    a processor coupled to the memory and the transceiver;
    wherein the processor is configured to execute a wireless communication method of claim 1.

5. The UE of claim 4, wherein the transceiver is configured to transmit, to the base station, a MAC CE configured to trigger the UL LBT failure MAC CE.

6. A wireless communication method by a base station, comprising:
- configuring, to a user equipment (UE), a listen before talk (LBT) failure recovery procedure;
- controlling the UE to detect an LBT failure per uplink (UL) bandwidth part (BWP); and
- controlling the UE to trigger an UL LBT failure medium access control (MAC) control element (CE) for one or more serving cells configured to trigger the LBT failure;
- wherein a format of the UL LBT failure MAC CE comprises a bitmap with a size equal to a maximum number of serving cells for a carrier group (CG);
- wherein in the bitmap of the format, a corresponding bit field of a corresponding serving cell is set to a first value if the corresponding serving cell has a consistent LBT failure; and
- the corresponding bit field of the corresponding serving cell is set to a second value if the corresponding serving cell does not have the consistent LBT failure;
- wherein the method further comprises receiving, from the UE, a MAC CE configured to trigger the UL LBT failure MAC CE;
- wherein if the MAC CE has been transmitted on the one or more serving cells, the UE cancels one or more triggered MAC CEs;
- wherein the LBT failure comprises the consistent LBT failure, wherein if the UE declares the consistent LBT failure for an active UL BWP and if the one or more serving cells comprises one or more secondary cells (SCells), the UE indicates a multiplexing and assembly entity to include the UL LBT failure MAC CE in a subsequent uplink transmission, and wherein the uplink transmission does not happen on the one or more SCells which have declared the consistent LBT failure.

7. The method of claim 6, wherein the serving cell information of the MAC CE comprises at least one of the followings:
- a report of failed cells;
- a MAC CE format configured to support entries to indicate one or more cells, wherein the one or more cells declares consistent LBT failure;
- one or more cell indexes of the UL LBT failure MAC CE where the LBT failure occurs; or
- a BWP related information in the MAC CE.

8. The method of claim 6, wherein if there are no available UL resources on one or more SCells which have not yet declared consistent LBT failure and/or there are no available UL resources on one or more special cells (SpCells), the UE triggers a scheduling request (SR) to request an UL grant.

9. A base station, comprising:
- a memory;
- a transceiver; and
- a processor coupled to the memory and the transceiver;
- wherein the processor is configured to configure, to a user equipment (UE), a listen before talk (LBT) failure recovery procedure;
- wherein the processor is configured to control the UE to detect an LBT failure per uplink (UL) bandwidth part (BWP);
- wherein the processor is configured to control the UE to trigger an UL LBT failure medium access control (MAC) control element (CE) for one or more serving cells configured to trigger the LBT failure; and
- wherein a format of the UL LBT failure MAC CE comprises a bitmap with a size equal to a maximum number of serving cells for a carrier group (CG);
- wherein in the bitmap of the format, a corresponding bit field of a corresponding serving cell is set to a first value if the corresponding serving cell has a consistent LBT failure; and
- the corresponding bit field of the corresponding serving cell is set to a second value if the corresponding serving cell does not have the consistent LBT failure;
- wherein the processor further performs receiving, from the UE, a MAC CE configured to trigger the UL LBT failure MAC CE;
- wherein if the MAC CE has been transmitted on the one or more serving cells, the UE cancels one or more triggered MAC CEs;
- wherein the LBT failure comprises the consistent LBT failure, wherein if the UE declares the consistent LBT failure for an active UL BWP and if the one or more serving cells comprises one or more secondary cells (SCells), the UE indicates a multiplexing and assembly entity to include the UL LBT failure MAC CE in a subsequent uplink transmission, and wherein the uplink transmission does not happen on the one or more SCells which have declared the consistent LBT failure.

10. The base station of claim 9, wherein the transceiver is configured to receive, from the UE, a MAC CE configured to trigger the UL LBT failure MAC CE.

* * * * *